Dec. 24, 1968   G. A. BARLOW ET AL   3,417,997
PENDULUM INDICATOR DEVICE
Filed Nov. 25, 1966
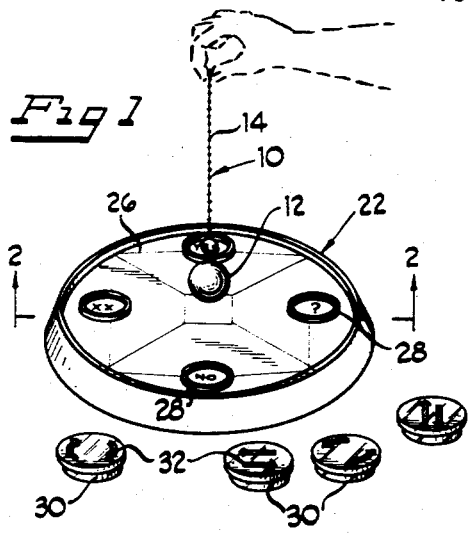
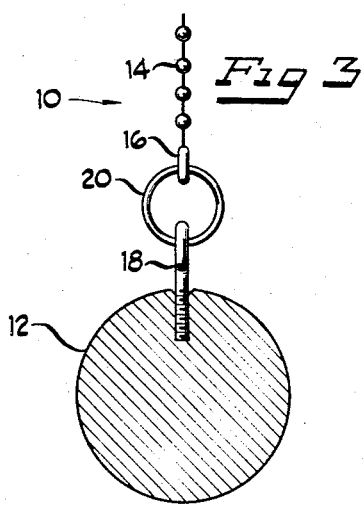
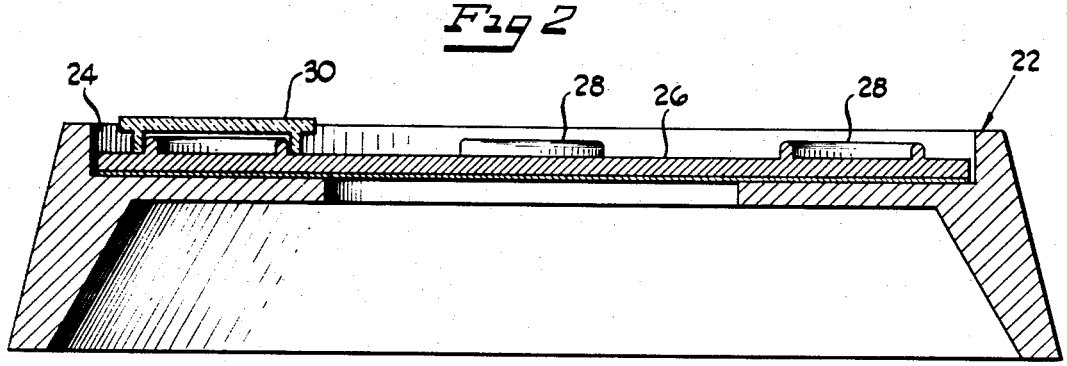
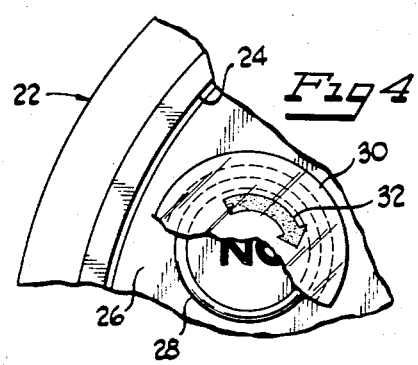
INVENTORS
GORDON A. BARLOW
NORMAN T. McFARLAND
BY Lucas & Coffee
ATTORNEYS United States Patent Office 3,417,997
Patented Dec. 24, 1968

3,417,997
PENDULUM INDICATOR DEVICE
Gordon A. Barlow, Chicago, and Norman T. McFarland, Urbana, Ill., assignors to Marvin Glass & Associates, Chicago, Ill., a partnership
Filed Nov. 25, 1966, Ser. No. 597,044
3 Claims. (Cl. 273—161)

The present invention relates generally to an amusement device and is particularly directed to a device for practicing the occult are of psychic communication.

Throughout mankind's history, there has always existed an interest in the mysterious and unknown, sometimes referred to as the occult arts, and such interest has been exemplified in many ways, as by the works of mediums, fortune tellers and the like. The present invention pertains particularly to a device which employs the traditional pendulum ball for communicating an unspoken thought or attitude on the part of the person holding the pendulum.

The primary object of the invention is to provide an amusement device wherein a pendulum ball is combined with apparatus for evidencing the thought or frame of mind of the person holding the pendulum and as such thought is expressed through the swinging movement of the pendulum. A more specific object of the invention is to provide apparatus including a board having indicia thereon signifying a pluality of different answers to stated questions, a pendulum ball, and removable elements each signifying a different direction of movement of the pendulum and adapted to be superposed on the indica on the board. Other objects and advantages will become apparent from the following description of the selected embodiment of the invention illustrated in the drawings wherein:

FIGURE 1 is a perspective plan view of the components of the amusement device;

FIGURE 2 is an enlarged section view taken along the line 2—2 in FIGURE 1;

FIGURE 3 is an enlarged fragmentary view of the pendulum, with the ball in section; and FIGURE 4 is an enlarged fragmentary plan view of the board with portions broken away to indicate the use of the removable elements.

The use of a swinging pendulum to indicate thoughts, attitudes, etc., is well-known and the present invention incorporates such a pendulum with particular means for translating the movement of the pendulum into definite answers or attitudes toward any of a series of questions posed to the holder of the pendulum, either by himself or by another. This is generally accomplished by first providing test questions for the holder of the pendulum, wherein the answers to such questions will provide different movements of the pendulum and then such movements are recorded on the board in association with general answers and for use in signifying the answers to subsequent questions.

The apparatus provided herein includes a pendulum 10 in the form of a steel ball 12 or the like, which is secured to one end of a flexible element 14, such as a metal chain of the bead type. More particularly, the end of the chain 14 includes a metal loop 16 (FIGURE 3), and the ball 12 has an eye hook 18 or the like screwed or otherwise fastened along its axis. A metal ring 20 is passed through the eye of hook 18 and through the loop 16 on the end of the chain, to thereby provide for free and universal movement of the ball 12 when the chain 14 is held at its free end with the ball suspended in space.

In the selected embodiment, a board 22 is provided which is generally in the shape of an inverted circular dish or bowl, with the upper surface including a recessed center portion defined by a circular flange 24 at the outer edges of the board. Within the recess formed by flange 24 is a flat circular member 26 having four raised circular portions 28 former thereon and spaced at 90 degrees with respect to one another around the outer edge of the circular member 26. Each of these raised portions 28 include indicia thereon indicating "Yes," "No," "XX," and "?," respectively, as seen in FIGURE 1. Further, there are provided four transparent circular elements 30 which are adapted to fit in covering relation to the indicia on portions 28 on the board, and each of these elements 30 is marked, as by arrows 32, to indicate a different direction of movement.

In utilizing the described apparatus, one person supports the pendulum 10 by holding the free end of the chain 14 lightly between his fingers, with the ball 12 elevated over the center of the board 22. The person holding the ball is then given a series of test questions to determine the mode of operation of the pendulum for that person. For example, the first test question will be such that the obvious answer is "Yes," and as the ball 12 begins to move its path of movement is noted and the removable element bearing arrows corresponding to such path of movement is then placed over the "Yes" sign. The next question for testing is one that clearly requires a "No" answer, and the path of movement of the ball 12 following such question is then noted and the corresponding removable element or market 30 is then placed over the "No" sign. The third question for testing is one that the holder of the pendulum is uninformed about, and the movement of the pendulum is then noted and the corresponding market placed over the "?" on the board to signify an "I don't know" answer. The remaining marker 30 is placed over the "XX" sign on the board and such movement of the pendulum with respect to all subsequent questions will signify that the holder of the ball refuses to answer the question put to him.

After the person holding the ball has thus been tested and the removable markers placed on the board, he is then questioned by other persons present, and the mode of movement of the pendulum 10 in response to each of the questions signifies his answer as being either affirmative, negative, uncertain, or a question which he refuses to answer. Of course, between each question the pendulum ball 12 is allowed to rest on the board 22, so that each time an answer is to be given the pendulum is initially at rest and is then elevated above the board so that it is permitted to swing freely.

It is seen, therefore, that the present invention provides an amusement device wherein any number of persons can participate and wherein the unspoken answer to questions presented is clearly in evidence to all persons.

Although shown and described with respect to particular apparatus, it will be apparent that various modifications might be made with departing from the principles of this invention.

What is claimed is:

1. An amusement device comprising a board having indicia thereon for indicating a plurality of different answers to a question posed, only one of said answers being the appropriate answer to a given question, a pendulum ball element having a flexible supporting means fixed thereto in a manner such that said ball element is free to swing clockwise, counter-clockwise, or in either of two linear directions when supported by means of a person holding the free end of said flexible supporting means, and movable market elements each having indicia thereon pictorially representing one of said paths of movement of said ball element and adapted to be placed on said board a predetermined selected position with respect to one of the indicia thereon.

2. An amusement device as set forth in claim 1, wherein said movable market elements are each adapted to overlie one of said indicia portions on the board and have a transparent surface through which said indicia is visible.

3. An amusement device as set forth in claim 1, wherein said board nicludes raised portions each bearing a different one of said indicia thereon, and said marker elements are shaped to be received by any one of said raised portions on the board in overlying relation to the indicia thereon.

References Cited

UNITED STATES PATENTS

| 1,514,260 | 11/1924 | Rees | 273—161 |
| 3,118,669 | 1/1964 | Merrill | 273—1 |
| 3,307,849 | 3/1967 | Foght | 273—161 |
| 3,307,850 | 3/1967 | Thomas | 273—161 |
| 3,312,470 | 4/1967 | Ames | 273—1 X |

ANTON O. OECHSLE, *Primary Examiner.*